United States Patent [19]

Jones et al.

[11] Patent Number: 4,850,660
[45] Date of Patent: Jul. 25, 1989

[54] HIGH EMISSIVITY ARTICLE HAVING MULTIPLE LAYERS OF A MATERIAL OF HIGH INTERNAL STRESS

[75] Inventors: David P. Jones, St. Asaph; Kevin Mullaney, Rhyl, both of United Kingdom

[73] Assignee: Pilkington P. E. Limited, United Kingdom

[21] Appl. No.: 79,237

[22] Filed: Jul. 29, 1987

[30] Foreign Application Priority Data

Aug. 6, 1986 [GB] United Kingdom ............... 8619193

[51] Int. Cl.$^4$ ........................... G02B 1/10; G02B 5/28
[52] U.S. Cl. ..................................... 350/1.6; 350/164
[58] Field of Search ................. 350/1.6, 164; 428/333

[56] References Cited

U.S. PATENT DOCUMENTS

| | | | |
|---|---|---|---|
| 3,432,225 | 3/1969 | Rock | 350/164 |
| 4,013,796 | 3/1977 | Swinehart et al. | 350/1.1 X |
| 4,157,215 | 6/1979 | Hanak | 350/314 X |
| 4,578,527 | 3/1986 | Rancourt et al. | 350/1.6 X |

FOREIGN PATENT DOCUMENTS 292125 10/1953 Switzerland ................... 350/164
1094008 5/1984 U.S.S.R. ...................... 350/1.6

Primary Examiner—Bruce Y. Arnold
Assistant Examiner—David J. Edmondson
Attorney, Agent, or Firm—F. Eugene Davis IV

[57] ABSTRACT

The article, typically for use in man-made satellites, has high emissivity and low reflectance in the thermal infrared wavebands between 6 and 30 microns, and also in the visible wavebands. The article is employed either to cover individual solar-cells, thereby protecting the cells from ionizing radiation and micro-meteoroids, and to protect the adhesive bonding the article to the solar cell from u-v light, or as a thermal control mirror to prevent heat build-up. The article has good emissivity in the thermal waveband regions, so the cell can be maintained at a relatively low temperature. The article employs a high internal stress material and a preferred embodiment comprises a glass substrate having a high emissivity coating comprising a stack of multiple relatively thin alternate layers of dysprosium fluoride and silicon oxide disposed immediately adjacent the substrate, and on the other hand, disposed above these layers, remote from the substrate, an anti-reflection coating comprising alternate layers of erbium oxide and dysprosium fluoride and an upper layer of silicon oxide.

15 Claims, 3 Drawing Sheets

HIGH EMISSIVITY ARTICLE HAVING MULTIPLE LAYERS OF A MATERIAL OF HIGH INTERNAL STRESS

BACKGROUND OF THE INVENTION

This invention relates to an article having high emissivity and hence low reflectance in the thermal infra-red wavebands of typically between 6 and 30 microns, and also in the visible wavebands.

Such an article can suitably be employed in, for example, man-made space satellites where it is desirable that such satellites be maintained at the lowest possible operating temperature or within a required temperature range. In such circumstances, the article is typically used either to cover individual solar-cells which provide the electrical power by which the satellite operates or as thermal control mirrors which help prevent heat build-up of the satellite which may be due to solar heating or thermal emission from within the spacecraft itself.

Such an article is known as a cover slip if it is required for covering a solar-cell, the main purposes of which are to protect the solar-cell from ionizing radiation and micro-meteroids; and to protect the adhesive used to bond the cover slip to the solar-cell from ultra-violet radiation which would otherwise tend to degrade it. In addition to this simple protection function, the cover slip should ideally have a good emissivity in the thermal waveband regions, so that the solar-cell can be maintained at as low a temperature as possible which in turn increases the efficiency of electrical output.

To achieve improved emissivity performance in the thermal infra-red regions is difficult if the cover slip is made of glass in view of the presence of so-called reststrahlen bands which give peaks of high reflectance around the 10 and 22 micron regions respectively. This means that around these peaks of high reflectance the solar-cell cover slip or thermal control mirror, as the case may be, is not operating very efficiently as an emitter of thermal radiation which in turn means that the temperature beneath the glass substrate of the cover slip or thermal control mirror remains relatively high.

In U.S. Pat. No. 4,578,527 there is shown an article having improved reflectance suppression within one of the reststrahlen regions referred to above in which a cover-slip is provided with a high emissivity coating comprised of a series of periods, each period consisting of a spacer layer of thorium fluoride and an absorber layer of silicon dioxide. It is claimed in this patent specification, the disclosure of which is incorporated herein by reference, that the emission characteristics of the coated article used to protect a solar-cell can be increased by up to 4%. This is apparently achieved by reducing the reflectance at the reststrahlen peak which occurs around the 10 micron region, which reflectance is stated as being decreased from a peak of around 75% reflectance to a peak of below 30%. Since approximately 38% of the "black body" thermal radiation which is emitted lies in the 7 to 13 micron range, it is clear that a reduction in the reflectance by the amount indicated would result in an improvement of the overall thermal emissivity characteristics of the coating for the article on which it is used, provided that the emissivity at the other reststrahlen region is not compromised.

However, despite the foregoiong, U.S. Pat. No. 4,578,527 acknowledges that at a temperature of around 300 K 53% of the "black body" thermal radiation occurs at wavelengths greater than 13 microns, a region of the spectrum in which it is further acknowledged that refractive index data for materials such as thorium fluoride are scarce.

One significant disadvantage is using thorium fluoride as the spacer layer results from the fact that it is radioactive, being an emitter of alpha particles and therefore in the construction of any article incorporating this material due care must be taken to protect against this radiation. We have found a further and perhaps more significant disadvantage associated with the use of thorium fluoride by making careful measurements in the regions of the electromagnetic spectrum above 13 microns, which measurements show that although thorium fluoride achieves a fairly good reduction in reflectance around the 10 micron region, the reststrahlen peak occurring around the 22 micron region is actually raised from the normal 24% reflectance to 48% reflectance using this material. Since, as stated previously, 53% of the "black body" thermal radiation emitted occurs above the 13 micron region, it is clear that this enhancement rather than suppression of the reststrahlen peak around the 22 micron region will have a deleterious effect on the overall emission characteristics of the article.

In U.S. Pat. No. 4,578,527 it is stated that thorium fluoride has a very desirable characteristic in that it has a relatively low internal stress and is capable of being deposited on relatively thin substrates without causing discernible warpage.

We have discovered that dysprosium fluoride, which has a high internal stress, can nevertheless still be used as a material forming part of an article having a high emissivity coating and which gives considerably better spectral emission performance in the reststrahlen bands occurring around the 10 and 22 micron regions than the use of thorium fluoride. This discovery has arisen due to the appreciation that although dysprosium fluoride does indeed have a very high stress and therefore cannot normally be deposited in layers which are quarter-wave optical thicknesses, if deposited as a series of very thin layers sandwiched between corresponding thin layers of an absorber material, which layers in total make up the required optical thickness, then the stress effects can be reduced to an acceptable level. Surprisingly, it has been found that such a construction gives, to a first approximation, the same emission characteristics as that of a theoretical two layer design utilizing dysprosium fluoride as one of the materials, but without having the problem of stress build up which would be found in such a two-layer design.

One major advantage of using dysprosium fluoride rather than thorium fluoride is that the former gives a significantly better performance at the reststrahlen peak occurring around the 22 micron region and although in this region the reststrahlen peak is still raised by the use of the material, experiments have shown that in single layer coatings it is raised from about 24% reflectance only up to about 34% reflectance, rather than up to the 48% reflectance found to occur with the use of single layer thorium fluoride coatings. Furthermore, our experiments have indicated that the corresponding performance in the reststrahlen peak which occurs around the 10 micron region is also improved and reflectance as low as 12.5% can be achieved.

SUMMARY OF THE INVENTION

According to the invention, there is provided an article for use over a spectrum including the visible wavebands and the infra-red wavebands of between 6 and 30 microns, the article comprising a substrate of the type including reststrahlen peaks of reflectance around the 10 and 22 micron regions respectively and a high emissivity coating, the coating comprising a stack of multiple thin alternate layers of at least two materials, one of the materials being a material normally having high internal stress and an index of refraction relatively close to that of the substrate, the other of the materials being a material which acts as an absorber with a complex index of refraction which is a function of wavelength and is also relatively close to the index of refraction of the substrate, the optical thickness of the stack amounting in total to a quarter-wavelength or multiples of a quarter-wavelength in the infra-red region of the spectrum.

Preferably, the material having high internal stress is dysprosium fluoride, the function of which is to act as an interface to optically couple thermal radiation into the absorber and substrate materials. The material which acts as an absorber is preferably silicon dioxide.

Preferably, the multi-layer stack is comprised of at least five layers, and preferably at least five layers of each of said two materials to total at least ten layers, which layers add up in total to a quarter-wavelength optical thickness in the infra-red region of the spectrum, or multiples of such a thickness.

In circumstances where the article is to be used as a cover for e.g. a solar-cell, it is important that the choice of both materials, i.e. the material having high internal stress and the material which acts as an absorber, is such as to have minimal inteference effects in the solar-cell sensitivity waveband of 0.4 to 1.1 microns, by having refractive indices relatively close to that of the substrate material in this waveband. Subsequently, reflection loss in this waveband can be minimised by the addition of a suitable anti-reflection coating. Preferably, the high emissivity coating is disposed adjacent to the substrate and such an anti-reflection coating comprises a multi-layer stack adjacent to the multi-layer stack of e.g. dysprosium fluoride and silicon dioxide but remote from the substrate. This anti-reflection construction may comprise a high refractive index inner layer combined with a medium refractive index second layer and a low refractive index outer layer. Conveniently, the inner layer is of erbium oxide ($Er_2O_3$), the second layer is of dysprosium fluoride ($DyF_3$) and the outer layer is of silicon dioxide ($SiO_2$). Two periods of the high and medium refractive index material and one period of the high and low index materials can be used. In such a design, an important feature is that the long wavelength emissivity efficiency of the underlying stack is not compromised.

BRIEF DESCRIPTION OF THE DRAWINGS

The invention will now be described, by way of example only, with reference to the accompanying drawings in which.

DETAILED DESCRIPTION OF THE INVENTION

Figure 1:
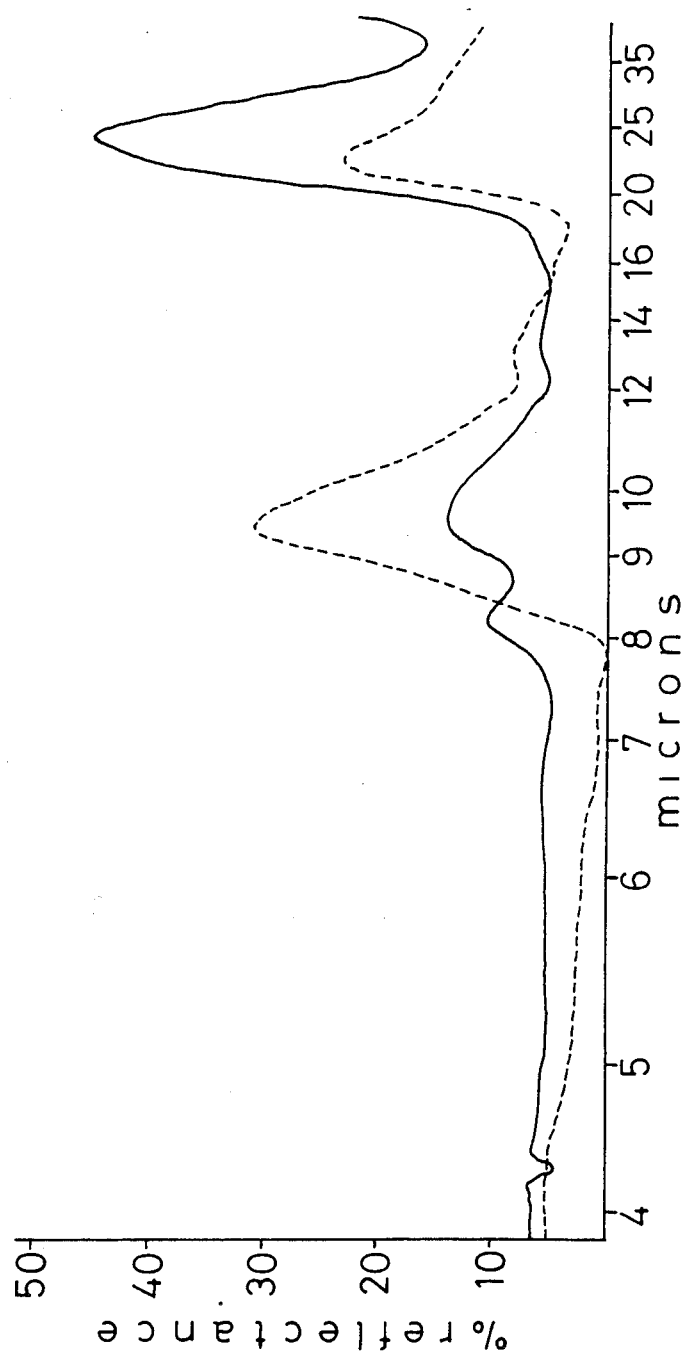
FIG. 1 is a graph showing the spectral characteristics of a single layer thorium fluoride coating.

Referring firstly to FIG. 1, there is shown in dotted outline the spectral characteristics of a plain glass article in the form of a cover slip which can be used to cover and hence protect a solar-cell. The spectral characteristics of the uncoated cover slip show that there are two major peaks of reflectance, one occurring around the 10 micron region and the other occurring around the 22 micron region. These are the so-called reststrahlen reflection peaks which normally inhibit thermal emission in these regions of the spectrum.

In contrast, the spectral characteristics of a glass substrate to which a single layer of thorium fluoride has been applied is shown in solid line and it will be immediately apparent that the reststrahlen peak normally occurring around the 10 micron region has, in this instance, been considerably reduced by the use of a thorium fluoride layer. The peak in this region has been reduced from about 32% reflectance to around 14% reflectance, although there is a subsidiary peak which emerges around the 8 micron region of around 10% reflectance. Nevertheless, it is clearly apparent that in this region of the spectrum the use of thorium fluoride as a single layer on a glass substrate significantly improves the thermal emission characteristics. However, it will also be apparent that in the region of the graph above 20 microns the corresponding reststrahlen peak which normally peaks at around the 22 micron region has, in this instance, been significantly increased from about 24% reflectance up to around 48% reflectance. Even so, since the total reflectance over the thermal emission range of 6 to 30 is represented by the area under each graph, it will be seen that the use of thorium fluoride does indeed give a small improvement over the entire range.

Figure 2:
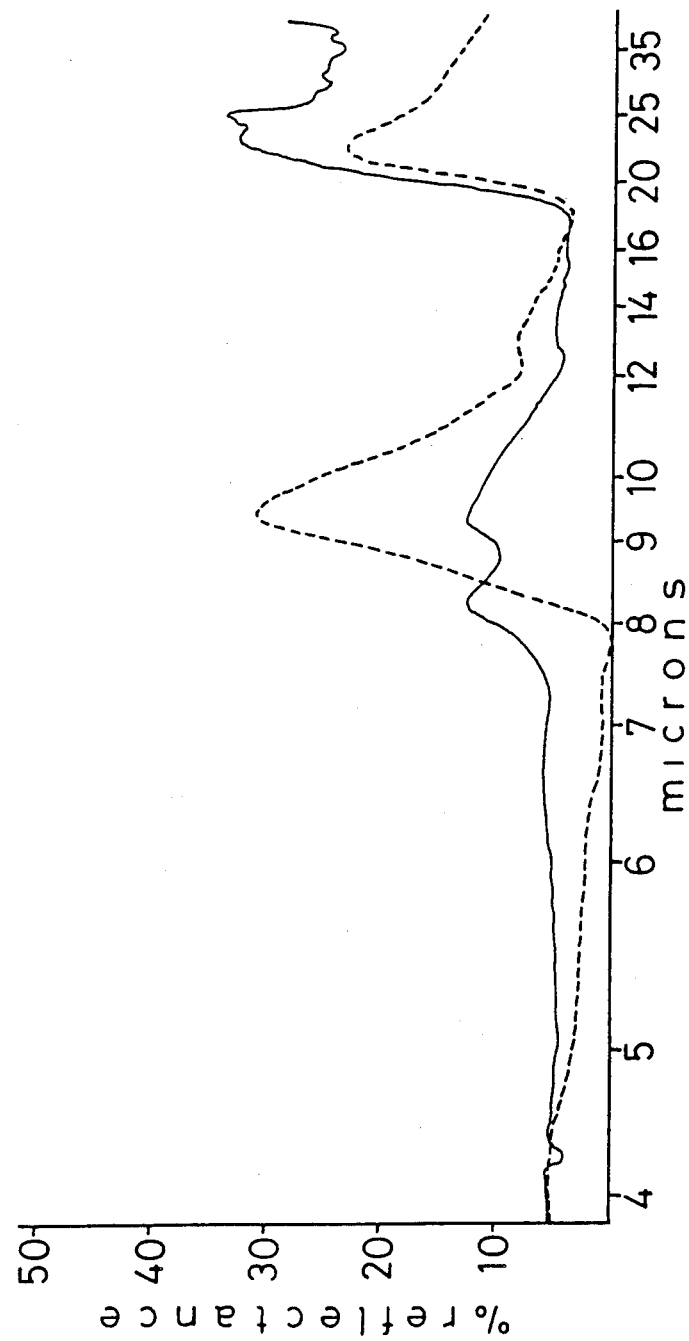
FIG. 2 is a graph showing the spectral characteristics of a single layer dysprosium fluoride coating.

Referring now to FIG. 2, there is shown a graph of the same type as FIG. 1 and in which the spectral characteristics of a glass substrate are shown in dotted outline and correspond exactly to the spectral characteristics of the glass shown in FIG. 1. In bolt outline is shown the spectral characteristics of a single layer of dysprosium fluoride on a glass substrate and, once again, it will be immediately apparent that the reststrahlen peak occurring around the 10 micron region has been considerably reduced, in this instance from 32% reflectance down to around 12.5% reflectance. Perhaps of more significance, however, is the fact that the reststrahlen peak around the 22 micron region is only raised from around 24% up to about 34%, rather than the 48% peak found to occur with the use of thorium fluoride, as shown in FIG. 1.

Once again, it is the area under the graph between the 6 to 30 micron range which effectively represents the efficiency of emission and it will be clearly seen that the use of dysprosium fluoride, rather than thorium fluoride achieves significantly better results. Of course, as stated previously, the high internal stress associated with dysprosium fluoride means that such a single layer coating cannot normally be used as a coating for an article requiring high emissivity characteristics. The purpose of the graphs shown in FIGS. 1 and 2 is simply to give a comparison of the respective spectral performances without taking into account problems caused by stress which would normally preclude the use of dysprosium fluoride in such an article as a solar-cell cover slip or a thermal control mirror.

Figure 3:
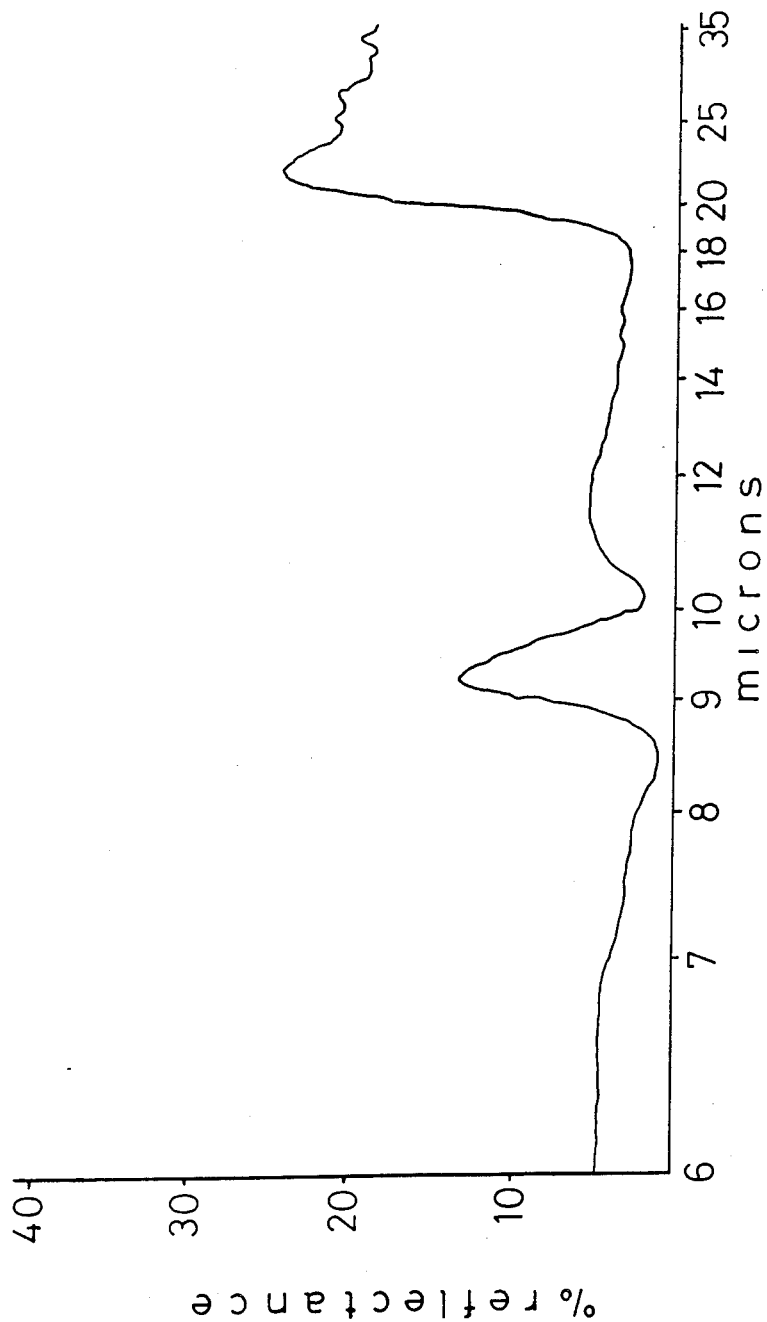
FIG. 3 is a graph showing the spectral characteristics of a coating according to the invention.

In FIG. 3 there is shown a graph of the spectral characteristics of a preferred coating design made in accordance with the findings of the invention, which design is suitable for use as a solar-cell cover slip and which also includes an anti-reflection coating for use in the solar-cell sensitivity waveband of between about 0.4 and 1.1 microns. It should be noted that the scale of the graph is different to the scale used in FIGS. 1 and 2. The graph indicates that with such a preferred design it is possible to reduce reflectance at the reststrahlen peak occuring around the 10 micron region down to around 13% reflectance, which generally corresponds to the level of reflectance indicated by the graph of FIG. 2. Of perhaps even more significance, however, is that the reflectance at the reststrahlen peak occuring around the 22 micron region is reduced down to around just 25%, compared to a reflectance of 34% indicated in FIG. 2 and a reflectance of 48% indicated in Figure 1. Thus, it will be apparent that the coating design indicated by the graph of FIG. 3 is a significant improvement over the expected equivalent single-coating design using either thorium fluoride or dysprosium fluoride.

The construction of a complete article incorporating the design of the invention, the spectral characteristics of which are shown in FIG. 3, is given below in the Example.

EXAMPLE

| Material | Physical thickness in microns |
| --- | --- |
| Air or Vaccuo | — |
| Silicon Dioxide | 0.1234 |
| Erbium Oxide | 0.0259 |
| Dysprosium Fluoride | 0.0679 |
| Erbium Oxide | 0.0327 |
| Dysprosium Fluoride | 0.0706 |
| Erbium Oxide | 0.0066 |
| Dysprosium Fluoride | 0.0672 |
| Siilicon Dioxide | 0.0423 |
| Dysprosium Fluoride | 0.0672 |
| Silicon Dioxide | 0.0471 |
| Dysprosium Fluoride | 0.0672 |

| Material | Physical thickness in microns |
| --- | --- |
| Silicon Dioxide | 0.0468 |
| Dysprosium Fluoride | 0.0672 |
| Silicon Dioxide | 0.0498 |
| Dysprosium Fluoride | 0.0592 |
| Silicon Dioxide | 0.0406 |
| Dysprosium Fluoride | 0.0592 |
| Silicon Dioxide | 0.0070 |
| Glass Substrate | — |

In such a design, the alternate layers of erbium oxide and dysprosium fluoride act as an efficient anti-reflection coating in the solar-cell sensitivity region of the spectrum. Additionally, the alternate layers of dysprosium fluoride and silicon dioxide effectively act as an anti-reflection coating, but this time in the 6 to 30 micron region, giving the considerable improvement in emissivity referred to earlier.

It will be seen that the multi-layer stack referred to in the Example is comprised of layers which are relatively very thin, particularly when compared to the corresponding thicknesses of the coating design disclosed in U.S. Pat. No. 4,578,527, referred to herein. Typically, the thicknesses employed in the present invention are at least an order of magnitude less than the corresponding thicknesses employed in the coating design disclosed in U.S. Pat. No. 4,578,527. As mentioned earlier, this is necessary because of the very high internal stress which is associated with the deposition of dysprosium fluoride. Normally, such surface stress exhibits itself by severe cracking or crazing of the layer, resulting in a very high scattering of any light which impinges thereon. However, as referred to earlier, the present invention effectively overcomes this problem by utilising extremely thin layers of this material, sandwiched between relatively thin layers of silicon dioxide.

The invention can also be utilised in e.g. thermal control mirrors for satellites which usually include a highly-reflecting surface applied to the underside of a substrate, the substrate being of a material such as glass which exhibits reststrahlen bands and thus requires, ideally, some form of improvement in emissivity which the invention affords. Other materials which exhibit reststrahlen bands include sodium chloride, sapphire, aluminium oxide and beryllium oxide.

It will be understood that the term 'high emissivity coating' means a coating which gives the article greater emissivity than the substrate has alone. As is also well understood in the art, the term 'thin layer' indicates an optical layer as distinct from a thick layer as is used in electronics. Further, the requirement for relatively close indices of refraction will be well understood by those skilled in the art. In the example given above the glass substrate has a refractive index of 1.53. The dysprosium fluoride has a refractive index of 1.51 giving a reflectance change of 0.5%. The silicon dioxide has a refractive index of 1.46 giving a reflectance change of 1.7%. It will be appreciated that these refractive values apply in the visible waveband and that at restrahlen wavelengths both the coating materials have complex indices of refraction. It will further be appreciated that the requirement for the two coating materials to have refractive indices relatively close to that of the substrate arises because it becomes increasingly difficult to anti-reflect a substrate with a large amplitude variable (with wavelength) reflectivity. The particular refractive index and reflectance values given above are, of course by way of example and other values which meet this requirement adequately for the circumstances may be employed. Generally, however, a reflectance change of not more than about 3%, and preferably not more than about 2%, would be desirable. Finally it will be understood that references to 'high internal stress' indicate stress levels which preclude or render undesirable normal quarter wave thickness layer deposition, and it will be appreciated that the alternating layers of the two materials provide a stress balancing effect in that there is alternating tensile and compressive stress in the successive layers.

What is claimed is:

1. An article for use over a spectrum including the visible wavebands and the infra-red wavebands of between 6 and 30 microns, the article comprising a substrate of the type including reststrahlen peaks of reflectance around the 10 and 22 micron regions respectively and including a high emissivity coating comprising;
   a stack of multiple thin alternate layers of at least two materials;
   one of the alternate layers of said stack being a material normally having a high internal stress such as to preclude or render undesirable a normal quarter wave thickness layer deposition and an index of refraction relatively close to that of the substrate;

the other of the alternate layers of said stack including a material which acts as an absorber with a complex index of refraction which is a function of wavelength and is relatively close to the index of refraction of the substrate, wherein the thickness of said stack amounts in total to a quarter-wavelength or multiples of a quarter wavelength in the infra-red region of the spectrum.

2. An article as claimed in claim 1, wherein the material having high internal stress is dysprosium fluoride.

3. An article as claimed in claim 1, wherein the material which acts as an absorber is silicon dioxide.

4. An article as claimed in claim 1, wherein said stack comprises at least five layers.

5. An article as claimed in claim 4, wherein said stack comprises at least five layers of each of said two materials to total at least ten layers.

6. An article as claimed in claim 1, comprising an anti-reflection coating in addition to said stack providing the high emissivity coating.

7. An article as claimed in claim 6, wherein said high emissivity coating is disposed adjacent to the substrate and said anti-reflection coating is disposed remote from the substrate.

8. An article as claimed in claim 7, wherein said anti-reflection coating comprises a multi-layer stack having a high refractive index inner layer combined with a medium refractive index second layer and a low refractive index outer layer.

9. An article as claimed in claim 8, wherein the inner layer material is erbium oxide, the second layer material is dysprosium fluoride and the outer layer material is silicon dioxide.

10. An article as claimed in claim 6, wherein said anti-reflection coating comprises a multi-layer stack having a high refractive index inner layer combined with a medium refractive index second layer and a low refractive index outer layer.

11. An article as claimed in claim 10, wherein said anti-reflection multi-layer stack incorporates two periods of the high and medium refractive index materials and one period of the high and low refractive index materials.

12. An article as claimed in claim 11, wherein the inner layer material is erbium oxide, the second layer material is dysprosium fluoride and the outer layer material is silicon dioxide.

13. An article as claimed in claim 10, wherein said inner layer material is erbium oxide, the second layer material is dysprosium fluoride and the outer layer material is silicon dioxide.

14. An article as claimed in claim 1, wherein the substrate is glass.

15. An article for use over a spectrum including the visible wavebands and the infra-red wavebands of between 6 and 30 microns, the article comprising a substrate of the type including reststrahlen peaks of reflectance around the 10 and 22 micron regions respectively and including a high emissivity coating comprising:

a stack of multiple thin alternate layers of at least two materials;

one of the alternate layers of said stack being dysprosium fluoride;

the other of the alternate layers of said stack including a material which acts as an absorber with a complex index of refraction which is a function of wavelength and is relatively close to the index of refraction of the substrate, wherein the thickness of said stack amounts in total to a quarter-wavelength or multiples of a quarter wavelength in the infra-red region of the spectrum.

* * * * *